(12) United States Patent
Periyasamy et al.

(10) Patent No.: US 10,334,488 B2
(45) Date of Patent: Jun. 25, 2019

(54) LTE CELL LEVEL NETWORK COVERAGE AND PERFORMANCE AUTO OPTIMIZATION

(71) Applicant: T-Mobile, USA, Inc., Bellevue, WA (US)

(72) Inventors: Sivakumar Periyasamy, Morris Plains, NJ (US); Dragan Stankic, Mendham, NJ (US); Gezim Krasniqi, Walnut Creek, CA (US); Ashwin Thomas, Plano, TX (US)

(73) Assignee: T-Mobile USA, Inc., Bellevue, WA (US)

( * ) Notice: Subject to any disclaimer, the term of this patent is extended or adjusted under 35 U.S.C. 154(b) by 182 days.

(21) Appl. No.: 15/390,867

(22) Filed: Dec. 27, 2016

(65) Prior Publication Data

US 2018/0184344 A1    Jun. 28, 2018

(51) Int. Cl.

| H04W 36/00 | (2009.01) |
|---|---|
| H04W 36/32 | (2009.01) |
| H04L 12/26 | (2006.01) |
| H04W 52/40 | (2009.01) |
| H04L 5/00 | (2006.01) |
| H04W 24/02 | (2009.01) |

(52) U.S. Cl.
CPC ....... *H04W 36/0083* (2013.01); *H04L 5/0048* (2013.01); *H04L 5/0057* (2013.01); *H04L 43/08* (2013.01); *H04L 43/16* (2013.01); *H04W 24/02* (2013.01); *H04W 36/32* (2013.01); *H04W 52/40* (2013.01)

(58) Field of Classification Search
None
See application file for complete search history.

(56) References Cited

U.S. PATENT DOCUMENTS

| 9,369,902 | B1* | 6/2016 | Sandhu | H04W 24/08 |
|---|---|---|---|---|
| 2013/0331109 | A1 | 12/2013 | Dhillon et al. | |
| 2014/0126438 | A1* | 5/2014 | Zhu | H04J 11/0093 370/311 |
| 2014/0140247 | A1* | 5/2014 | Venkata | H04W 4/90 370/259 |
| 2015/0024735 | A1* | 1/2015 | Ibbotson | H04W 24/04 455/423 |
| 2017/0013476 | A1* | 1/2017 | Suthar | H04W 24/02 |
| 2017/0118727 | A1* | 4/2017 | Panchal | H04W 52/365 |
| 2018/0084049 | A1* | 3/2018 | Wu | H04L 67/1097 |

* cited by examiner

*Primary Examiner* — Kodzovi Acolatse
(74) *Attorney, Agent, or Firm* — Han Santos, PLLC

(57) ABSTRACT

Systems and methods are provided to administer a wireless telecommunication network (WTN) having a plurality of cell sites. Network data is received from a data source for a subject cell site. A baseline performance of the subject cell site is determined. Parameters to optimize for the subject cell site based on the baseline performance are identified. An uplink (UL) transmission power of the subject cell site based on a VoLTE drop call rate is adjusted. A downlink (DL) transmission power of a cell specific reference signal (CRS) of the subject cell site is adjusted. A handover operation between the subject cell site and a second cell site is adjusted. A transmission range of the subject cell site is adjusted.

20 Claims, 9 Drawing Sheets

600A

| | Example Condition | Relevant KPI's | Example Solution | | | | |
|---|---|---|---|---|---|---|---|
| | | | | Baseline | | New Setting | |
| 600A | Throughput in L2100 < L700 | > Average Connected Users Per Cell Site<br>> DL Traffic Volume L700<br>> UE DL Throughput L700<br>> Cell DL Throughput L700<br>> DL PRB Utilization L700<br>> Average Connected Users L2100<br>> DL Traffic Volume L2100<br>> UE DL Throughput L2100<br>> Normalized UE DL Throughput L2100<br>> Cell DL Throughput L2100<br>> DL PRB Utilization L2100 | Parameter Name | L2100 | L700 | L2100 | L700 |
| | | | lbthreshold | 150 | 150 | 120 | 120 |
| | | | lbActivationThreshold | 0 | 0 | 0 | 250 |
| | | | a5Threshold1RSRP | -105 | -105 | -102 | -105 |
| | | | | Baseline | | New Setting | |
| 600B | Throughput in L700 < L2100 | > Average Connected Users Per Cell Site<br>> DL Traffic Volume L700<br>> UE DL Throughput L700<br>> Cell DL Throughput L700<br>> DL PRB Utilization L700<br>> Average Connected Users L2100<br>> DL Traffic Volume L2100<br>> UE DL Throughput L2100<br>> Normalized UE DL Throughput L2100<br>> Cell DL Throughput L2100<br>> DL PRB Utilization L2100 | Parameter Name | L2100 | L700 | L2100 | L700 |
| | | | lbthreshold | 150 | 150 | 100 | 100 |
| | | | lbActivationThreshold | 0 | 0 | 350 | 0 |
| | | | a5Threshold1RSRP | -105 | -105 | -105 | -102 |
| 600C | Maximizing Coverage: Leakage vs. Drop Rate | > VOLTE Calls<br>> VOLTE Drop Rate<br>> LTE Data Drop Rate<br>> Average UE DLTHROUGHPUT<br>> SC + PSHO to WCDMA<br>> SC + PSHO Releases to WCDMA | Parameter Name | Baseline | | New Setting | |
| | | | a2CriticalThresholdRsrp | 126 | | 128 | |
| | | | b2Threshold1Rsrp | 120 to 124 | | 122 to 126 | |
| | | | timeToTriggerB2 | 640 | | 1024 | |
| 600D | Power Restriction: Poor UL Coverage | > VOLTE Drop Rate<br>> LTE Data Drop Rate<br>> VOLTE Calls<br>> Power Restricted Samples/Cell Site<br>> Power Unrestricted Samples/Cell Site<br>> Power Restriction Ratio<br>> % Drop Calls @ < 120 RSRP in True Call | Parameter Name | Baseline | | New Setting | |
| | | | pZeroNominalPusch | -103 | | -85 | |
| | | | alpha | 10 | | 8 | |

| | Example Condition | Relevant KPI's | Example Solution | | |
|---|---|---|---|---|---|
| 600E | Layer Management: Poor Coverage on L700 vs. L2100 | > VOLTE Calls L700<br>> VOLTE Drop Rate L700<br>> Average RSRP L700<br>> Bad Coverage IndicatorSearch L700<br>> Average UL Path Loss L700<br>> VOLTE Calls L2100<br>> VOLTE Drop Rate L2100<br>> Average RSRP L2100<br>> Bad Coverage IndicatorSearch L2100<br>> Average UL Path Loss L2100<br>> % Drop Calls @ < 106 RSRP in True Call | MOC | Parameter Name | L700 |
| | | | ReportConfigSearch | a1a2SearchThresholdRsrp | -106 |
| | | | ReportConfigSearch | a2CriticalThresholdRsrp | -122 |
| | | | EUtranCellFDD | qRxLevMin | 116 |
| 600F | Layer Management: Poor Coverage on L2100 vs. L700 | > VOLTE Calls L700<br>> VOLTE Drop Rate L700<br>> Average RSRP L700<br>> Bad Coverage IndicatorSearch L700<br>> Average UL Path Loss L700<br>> VOLTE Calls L2100<br>> VOLTE Drop Rate L2100<br>> Average RSRP L2100<br>> Bad Coverage IndicatorSearch L2100<br>> Average UL Path Loss L2100<br>> % Drop Calls @ < 114 RSRP in True Call | MOC | Parameter Name | L2100 |
| | | | ReportConfigSearch | a1a2SearchThresholdRsrp | -106 |
| | | | ReportConfigSearch | a2CriticalThresholdRsrp | -122 |
| | | | EUtranCellFDD | qRxLevMin | 116 |
| 600G | CRS Gain Change: Scramble Code to WCDMA < 0.5%; SC to GSM < 0.5%, and > 50% of HO Attempts to Neighbors < average Neighbor Distance | > SC WCDMA Rate<br>> SC GSM Rate<br>> Neighbor HO Criteria | Parameter | Baseline | New Setting |
| | | | crsGain | 300 | 0 |
| | | | pdschTypeBGain | 1 | 0 |
| 600H | CRS Gain Change: 0.5% < SC to WCDMA < 1% and 0.5< SC to GSM < 1% and > 50% of HO Attempts to neighbors less than average neighbor distance (excluding co-located sectors). | > SC WCDMA Rate<br>> SC GSM Rate<br>> Neighbor HO Criteria | Parameter | Baseline | New Setting |
| | | | crsGain | 300 | 177 |
| | | | pdschTypeBGain | 1 | 1 |
| 600I | PDCCH HO Robustness: CFI 1 Utilization > 95% and HO Execution Success Rate < 97% | > PMPDCCHCFIUTIL_2<br>> PMPDCCHCFIUTIL_1<br>> PMPDCCHCFIUTIL_0<br>> CFI 1%<br>> HO Execution Success Rate | Parameter | Baseline | New Setting |
| | | | 1308-AdaptiveCFIHOProhibit | 0 | 1 |
| 600J | Coverage Boost: PDCCH Power Boost (High % TX Aggressive . 40% and PDCCH Usage < 10%) | > PDCCH Usage<br>> %TX Aggressive | Parameter | Baseline | New Setting |
| | | | Feature State: Pdcch Power Boost | FALSE | TRUE |
| | | | pdcchpowerboostmax | 0 | 1 |

FIG. 6B

| Example Condition | | Relevant KPI's | Example Solution | | | |
|---|---|---|---|---|---|---|
| | | | Parameter | Baseline | Source to Neighbor Relation | Comment |
| 600K | Mobility Optimization - Too Late HO (> 50% of Too Late Handovers & PMHOTOOLATEHOINTRAF > 20, Source Cell PMERABRELABNORMALENBAC THO > 10 | > PMHOTOOLATEHOINTRAF >PMERABRELABNORMALENBACTHO > Source Cell Drops due to HO | cellIndividualOffsetEutran | 0 | 1,2,3 | 1: Too Late% (between 50 and 70%) 2: Too late % (between 70 and |
| | | | qoffsetEutran | 0 | -1,-2,-3 | Set opposite to that of cellindividualoffseteutran |
| 600L | Mobility Optimization - Too Early HO (> 50% of Too Early Handovers & PMHOTOOEARLYHOINTRAF>20 , Target PMERABRELABNORMALENBAC THO > 10 | > PMHOTOOEARLYHOINTRAF > PMERABRELABNORMALENBACTHO > Neighbor Cell Drops due to HO | cellIndividualOffsetEutran | 0 | -1,-2,-3 | 1: Too Late% (between 50 and 70%) 2: Too late % (between 70 and |
| | | | qoffsetEutran | 0 | 1,2,3 | Set opposite to that of cellindividualoffseteutran |

| | Example Condition | Relevant KPI's | Example Solution | | |
|---|---|---|---|---|---|
| | | | Parameter | Baseline | New Setting |
| 600M | Mobility Optimization - HO to Wrong Cell (Distance beetween Source and Target > 4 miles and High number of HO to wrong Cell (e.g., > 20); HO to Wrong Cell % > 50% on a particular relation | > Distance between Source and Target > Wrong Cell % > PMHOWRONGCELLINTRAF | isHoAllowed | TRUE | FALSE |
| | | | isRemoveAllowed | TRUE | FALSE |
| 600N | Layer Management: MLSTM (VOLTE DCR higher on L21 or L19 compared to its collocated VOLTE DCR on L7) | > VOLTE Calls L2100 or L1900 > VOLTE Droprate L2100 or L1900 > VOLTE Calls L700 > VOLTE Droprate L700 | MOC | Parameter Name | L2100 or L1900 |
| | | | ReportConfigSearch | qciA1A2ThrO ffsetsqc1.a1a 2ThRsrpQciO ffset | 10 |
| 600O | Layer Management: MLSTM (VOLTE DCR higher on L7 in comparison to the L21 or L19 Top N Neighbors) | > VOLTE Calls L2100 or L1900 > VOLTE Droprate L2100 or L1900 > VOLTE Calls L700 > VOLTE Droprate L700 | MOC | Parameter Name | L7 |
| | | | ReportConfigSearch | qciA1A2ThrO ffsetsqc1.a1a 2ThRsrpQciO ffset | 7 |

FIG. 6D

LTE CELL LEVEL NETWORK COVERAGE AND PERFORMANCE AUTO OPTIMIZATION

BACKGROUND

Wireless telecommunication networks have evolved into complex systems that include various hardware that is often controlled with complex software via a central station. Initial implementations of such wireless communications, for example in the form of cellular telephone networks, supported circuit switched voice communication services. The carriers developed short message service (SMS) technology to provide text and/or e-mail communications via the wireless communication networks. As the wireless communication networks have evolved to provide greater bandwidth and packet based services, the wireless industry has developed a variety of data services, such as email, web browsing, as well as a variety of services using multimedia message service (MMS) technology. To accommodate the increasing demand of such wireless services, large scale wireless telecommunication networks often include an increasing number of cell sites, sometimes referred to as base stations, which are used to service mobile devices in various locations.

To effectively manage these wireless telecommunication networks, administrators track various key performance indicators (KPI's) for each cell site. To administer the increasing number of cell sites, these cell sites are adjusted to have substantially similar configurations. Thus, cell sites are typically configured using a network-wide optimization that configures each cell site using substantially similar parameters. Such holistic approach for the entire network may be time efficient, but it often leaves individual cell sites to operate under non optimal conditions. While individual optimization of each cell site may be possible, it is generally avoided due to high administrative cost.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

FIGS. 6A to 6D provide a summary of relevant KPI's and example solutions for various corrections to be performed onto individual cell sites.

DETAILED DESCRIPTION

Overview

The techniques and systems described herein are directed, in part, to optimizing network performance by optimizing the performance of individual cell sites and/or a cluster of individual cell sites of a wireless telecommunication network and then optimizing each cell site (or cluster of cell sites), thereby optimizing performance of a network as a whole. The cell sites may be base stations, radio access points/networks, sites and/or other hardware that directly or indirectly exchanges communications with user devices such as mobile telecommunication devices (e.g., user handsets, user hardware, etc.) collectively referred to herein as user equipment (UE). By optimizing each cell cite individually, the performance of the individual cell site can be improved, thereby better serving the subscribers and providing more efficiency to the wireless network provider. In some scenarios, cell sites that are exhibiting similar KPI values may be grouped together, such group being referred to herein as a cell cluster, which can be optimized together.

By virtue of optimizing each cell site individually or in clusters exhibiting common performance issues, a wireless service provider may improve network performance. In addition, the optimization of each cell site individually or by way of a cluster may provide significant service improvements (e.g., fewer dropped calls, more available bandwidth, etc.) than an optimization that is applied across the entire network or an optimization that is based on geographic locations (e.g., optimizing cell sites for a city, a rural area, etc.,). The techniques and systems described herein may be implemented in a number of ways. Example implementations are provided below with reference to the following figures.

Illustrative Environment

Figure 1:
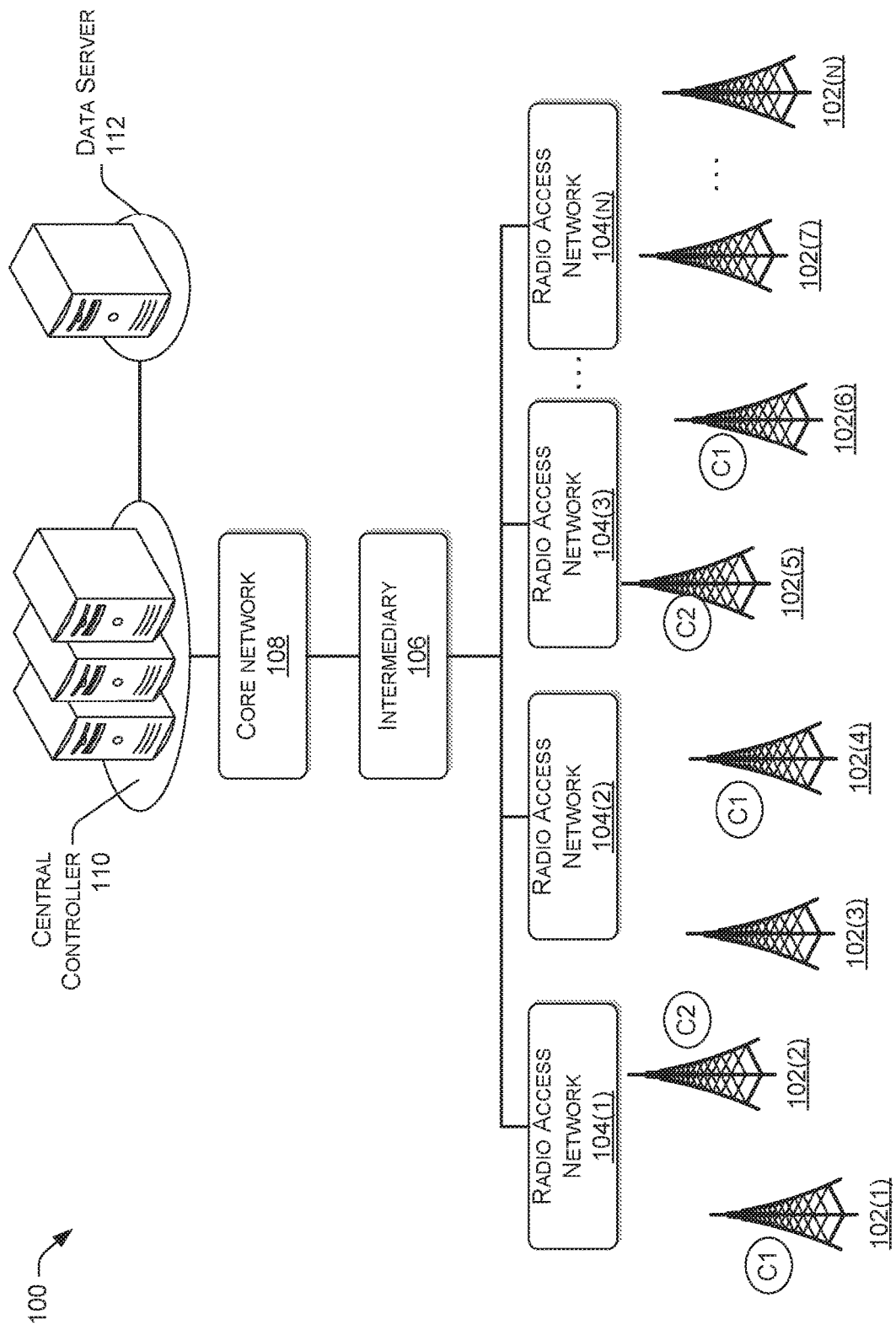
FIG. 1 is an example architecture for implementing a wireless network system configured to optimize cell sites.

FIG. 1 is an example architecture for implementing a wireless network system configured to optimize cell sites. Cell sites 102(1) to 102(N) may be optimized by a central controller 110 individually or by intelligent clusters that have common key performance indicators (KPI) values. The wireless telecommunication network 100 may include a plurality of hardware, software, and other infrastructure components that may be typical of a large wireless telecommunications provider. The cell sites 102(1) to 102(N) are associated with a radio access networks (RANs) 104(1) to 104(N) used for mobile communications. The cell sites 102(1) to 102(N) may be located across different geographic areas to facilitate providing network access and connectivity to users in their corresponding geographic area. The cell sites 102(1) to 102(N) may be base stations, or other network end points (or possibly intermediary points) that exchange communications with user devices, such as mobile telecommunication devices, computing devices, or other devices that have wireless connectivity. The RANs 104 may be in communication with a core network 108 directly or through one or more intermediaries 106, depending on the size and complexity of the wireless telecommunication network 100.

In accordance with one or more embodiments, the wireless telecommunication network 100 may conform to Universal Mobile Telecommunications System (UMTS) technologies that employ UMTS Terrestrial Radio Access Network (UTRAN). In some instances, the UTRAN may share a several components like a Circuit Switch (CS) and a Packet Switch (PS) core network with a GSM EDGE Radio Access Network (GERAN) (Global System for Mobile Communications (GSM), Enhanced Data rates for GSM Evolution (EDGE)). In various instances, a 4G long term evolution (4G/LTE) network that comprises Evolved UMTS Terrestrial Radio Access Network (EUTRAN) may be employed to transmit data for the telecommunications networks, besides UMTS or GSM. Thus, EUTRAN, UTRAN and GERAN networks (and other possible RANs) may coexist to process telecommunications traffic.

In some instances, communications may be handed off between EUTRAN, UTRAN and GERAN networks (or other networks) and still maintain a communication with a common core network, such as when a UE leaves a range of access (zone) of a EUTRAN and enters a range of access of a UTRAN or GERAN. Handoffs may also occur between different types of hardware (e.g., different manufacturers, versions, etc.) for a same network type (e.g., EUTRAN, UTRAN, GERAN, etc.). For discussion purposes, it will be assumed that the architecture of FIG. 1 represents a 4G/LTE network that includes one or more evolved Node B's (eNodeB's), represented herein by cell sites 102(1) to 102(N), which provide an interface between a UE, such as a wireless handheld device that is configured to communicate over the radio access network 104(1) to 104(N) and the core network 108. Each eNodeB couples with the core network 108 via the mobility management entity (MME), represented by the intermediary layer 106, which is a control-node.

In accordance with one or more embodiments, other types of networks, RANs, and/or components (hardware and/or software) may be employed that enable telecommunications devices to communicate with the core network 108 to facilitate activities such as voice calling, messaging, emailing, accessing the Internet, or other types of data communications. For example, the wireless telecommunication network 100 may be, at least in part, a Wi-Fi based network, a Bluetooth network, or other type of wireless network.

The wireless telecommunication network 100 may include a central controller 110 to manage network performance optimizations for each cell cite and/or cell site clusters based on predetermined common KPI values. The central controller 110 may be in communication with one or more of the various components of the wireless telecommunication network 100, such as the core network 108, the one or more intermediaries 106, the RANs 104(1) to 104(N), and/or the cell sites 102(1) to 102(N).

In one embodiment, the wireless telecommunication network 100 includes a data server 112 that is configured to provide information related to the performance of each cell site individually, clusters of cell sites, or over the entire network. Such information may include, for each cell site, a baseline information of KPI's, historical information regarding the KPI's, trend information of the KPI's, etc. In some embodiments, the data server 112 provides some of the aforementioned information or additional performance information to the central controller 110.

In some embodiments, the controller 110 may identify parameters (i.e., KPI's) associated with the various cell sites and then create one or more cell clusters based at least in part on the KPI's. For example, the first cluster may comprise cell sites 102(1), 102(4) and 102(6), as denoted by way of example in FIG. 1 by the designation C1. A second cluster may comprise cell sites 102(2) and 102(5), as denoted by the designation C2. A cell site need not be part of a cluster in order to be optimized by the central controller 110. Rather, cell sites that exhibit common KPI values may be grouped together for common control as a cluster. In some embodiments, cell sites that exhibit KPI values that are indicate a requirement of an adjustment are grouped together for common control. Thus, each cell may be controlled independently, and while clustering may be performed, it need not be based on geographic proximity but on common performance indicators. In this way, the wireless telecommunication network 100 can be optimized efficiently. The determination of the parameters (i.e., KPI's), various adjustments performed for a cell site, formation of the clusters, collection of KPIs, and other operations of the controller 110 are explained in further detail below.

Illustrative Computing Architecture

Figure 2:
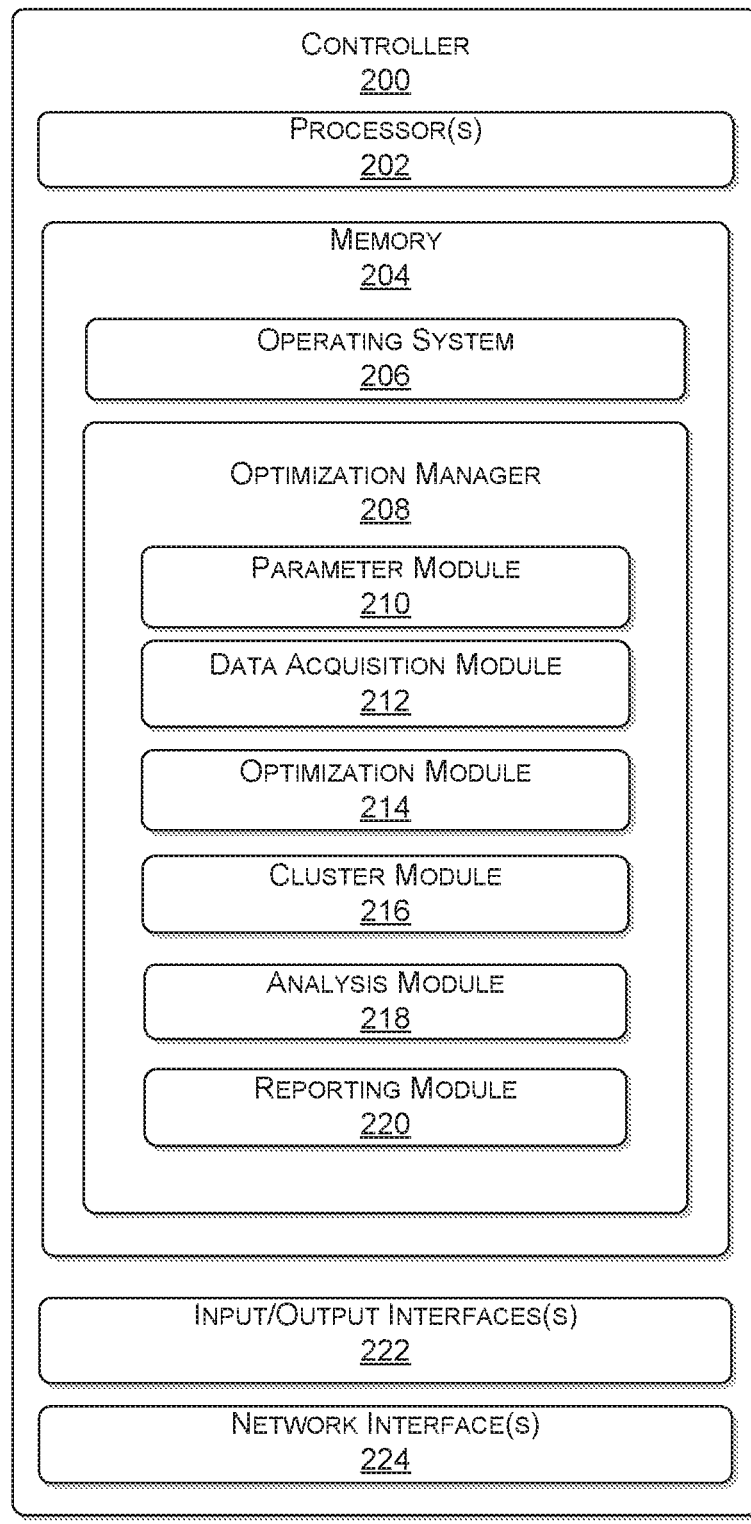
FIG. 2 is a block diagram of an illustrative controller configured to optimize network performance of cell sites.

FIG. 2 is a block diagram of an illustrative controller 200 to optimize network performance of cell sites. The controller 200 may be used to implement the functions of the central controller 110 of FIG. 1. Accordingly, controller 200 may include various modules that perform the functions to optimize the performance of cell sites individually. In some embodiments, the controller 200 also creates and defines groups of cell sites, referred to herein as clusters, adds or assigns cell sites to the clusters, and performs optimizations to the cell sites 102(1) to 102(N) of each cluster to optimize the overall network performance. In various embodiments, the controller 200 may be hosted by one or more servers in a non-distributed configuration (e.g., server farm, etc.) or a distributed configuration (e.g., cloud service, etc.).

The controller 200 may include one or more processors 202 and memory 204 that stores various modules, applications, programs, or other data. The memory 204 may include instructions that, when executed by the one or more processors 202, cause the processors to perform the operations described herein for the controller 200 (e.g., the central controller 110). The memory 204 may include, but is not limited to, non-transitory memory that may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. In some embodiments, the memory 204 may include transitory signals, such as signals that a computer system or machine hosting or running a computer program can be configured to access, including signals downloaded through the Internet or other networks.

In the illustrated example, the memory 204 may include an operating system 206 and various applications, such as an optimization manager 208 that may be used to optimize the performance of individual cell sites and/or clusters of cell sites. Execution of the optimization manager 208 by the processor(s) 202 configures the controller 200 to perform various functions. In one embodiment, these functions may be controlled by different modules, such as a parameter module 210, data acquisition module 212, optimization module 214, cluster module 216, analysis module 218, reporting module 220, etc. The operating system 206 may be used to implement these modules. The operating system 206 may be any operating system capable of managing computer hardware and software resources. The modules discussed herein may include routines, program instructions, objects, and/or data structures that perform particular tasks or implement particular abstract data types.

The parameter module 210 may identify various parameters associated with the cell sites, referred to herein as KPI's. The parameters may include metrics, attributes, or other associated data for each cell site. Some of the parameters may be time-dependent, such as parameters that provide input/output data, service data, performance data (e.g., power used, dropped calls, etc.,). Other parameters may not be time dependent, such as location information, software specifications, hardware specifications, network attributes, etc. The parameter module 210 may identify available parameters and, in some instances, identify parameters that impact, drive, or are associated with key result areas to enable optimization of the network performance. In various embodiments, the parameter module 210 may receive input from a data source, such as a server that is configured to provide baseline information for individual cells, clusters of cells, and/or the entire wireless telecommunication network, similar to the data server 112 of FIG. 1. In some embodiments, the parameter module 210 may also receive user input, such as input from an administrator and/or engineer to assist in identification, labeling, or other tasks associated with the parameters.

The data acquisition module 212 may retrieve the parameters from various sources. For example, the data acquisition module 212 may link tables maintained and updated by various servers, such as the data server 112. The acquisition module 212 may compile the parameters over a predetermined period of time. The acquisition module 212 may perform basic operations on the obtained data, such as calculate an average, a mean, a maximum value, a minimum value, and/or perform other calculations using the obtained data. The data acquisition module 212 may also retrieve network attributes from various servers, such as the data server 112, or from individual cell sites 102(1) to 102(N), either directly or through servers such as the data server 112.

The optimization module 214 determines one or more parameters (or network attributes) to optimize (i.e., adjust) for each cell site individually. In some scenarios, the optimization module may be used to optimize one or more parameters of clusters of cell sites. The optimization module 214 may optimize each cell site and/or cluster of cell sites in different ways. For example, the optimization module 214 may increase a value or setting for a first parameter associated with a first cell site and may decrease a value or setting for a second parameter for a second cell site. In some embodiments, the optimization module 214 may make different adjustment based on the values of the parameters or KPI's of a cell site. For example, a first cell site may receive a first adjustment while a second cell sites may receive a second adjustment that is different than the first adjustment. In another example, a first cell site in the first cluster may receive a first adjustment while a second range of cell sites in the first cluster may receive a second adjustment that is different than the first adjustment.

As discussed previously, in some embodiments, adjustments to parameters are performed to clusters. In this regard, the cluster module 216 may define a cluster based at least in part on the parameters received from the data acquisition module 212. For example, the cluster module 216 may identify key parameters that have associated conditions. Cell sites that include the key parameters that have satisfied the conditions (e.g., exceed a threshold value, below a threshold value, etc.) may be included (e.g., added, assigned, etc.) in the cluster. Thus, the cluster is defined by cell sites that include parameters having specific ranges of values. In some embodiments, the clusters are not defined based on geographic region, but on similar KPI values.

The analysis module 218 may analyze performance of the cell sites and/or the various components of the wireless telecommunication network 100 following implementation of the optimization. In various embodiments, the analysis module 218 may initiate retrieval of data from a data server 112 via the data acquisition module 212. For example, the analysis module 218 may refer to historic data of one or more cell sites to determine a baseline performance of one or more KPI's for the one or more cell sites. To that end, the analysis module 218 triggers the data acquisition module to interact with the data server 112 to retrieve stored historical data regarding the relevant one or more cell sites.

In one embodiment, the analysis module 218 can trigger the cluster module 216 to cluster a group of cell sites that are deemed by the analysis module to belong together. Similarly, the analysis module 218 can trigger the cluster module 216 to undo a cluster or to remove a cell site from a cluster if it deems that the cell site no longer belongs to a cluster, based on the analysis performed.

The reporting module 220 may report results of the performance of the cell sites and/or the various components of the wireless telecommunication network 100 following implementation of the optimization. The reporting module 220 may be used to trigger a subsequent refreshing of the optimizations, clustering, or other tasks performed by the optimization manager 208 at predetermined intervals or upon a trigger event.

In the illustrated example, the controller 200 may further include input/output interface(s) 222. The input/output interface(s) 222 may include any type of output interface known in the art, such as a display (e.g., a liquid crystal display), speakers, a vibrating mechanism, or a tactile feedback mechanism. Input/output interface(s) 222 also include ports for one or more peripheral devices, such as headphones, peripheral speakers, or a peripheral display. Further, the input/output interface(s) 222 may further include a camera, a microphone, a keyboard/keypad, or a touch-sensitive display. A keyboard/keypad may be a push button numerical dialing pad (such as on a typical telecommunication device), a multi-key keyboard (such as a conventional QWERTY keyboard), or one or more other types of keys or buttons, and may also include a joystick-like controller and/or designated navigation buttons, or the like.

In the illustrated example, the controller 200 may further include one or more network interface(s) 224. The one or more network interface(s) 224 may include any sort of transceiver known in the art. For example, the one or more network interface(s) 224 may include a radio transceiver that performs the function of transmitting and receiving radio frequency communications via an antenna. In addition, the one or more network interface(s) 224 may also include a wireless communication transceiver and a near field antenna for communicating over unlicensed wireless Internet Protocol (IP) networks, such as local wireless data networks and personal area networks (e.g., Bluetooth or near field communication (NFC) networks). Further, the one or more network interface(s) 224 may include wired communication components, such as an Ethernet port or a Universal Serial Bus (USB).

Example Computing Architecture

Figure 3:
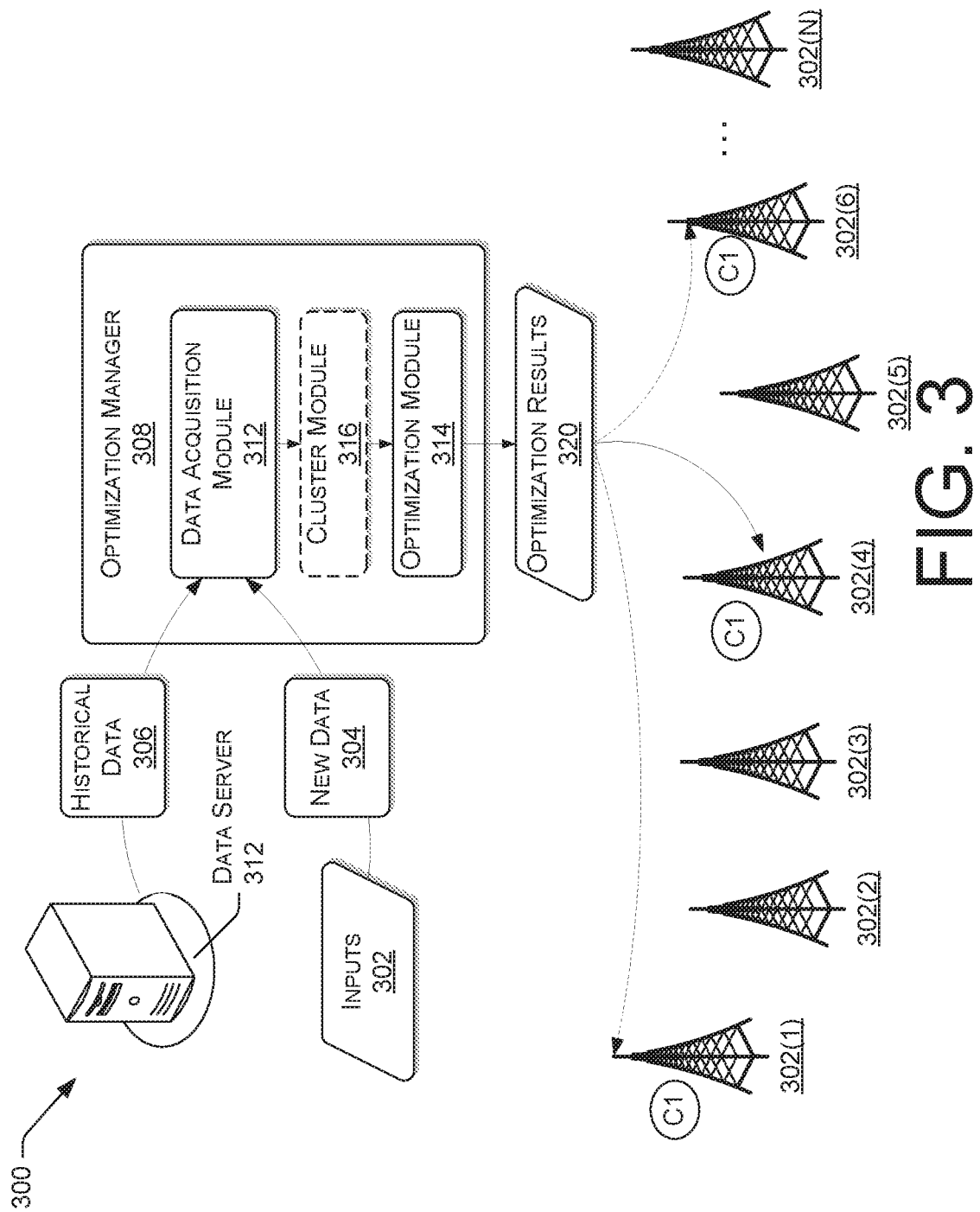
FIG. 3 illustrates an example schematic diagram of a computing architecture that can be used to perform automatic optimizing a cell individually and in clusters.

Reference now is made to FIG. 3, which illustrates an example schematic diagram of a computing architecture 300 that can be used to perform various functions described herein, including automatically optimizing a cell individually, and automatically clustering of cell sites for optimization of a network. The architecture 300 may include an optimization manager 308. For illustrative purposes, the optimization manager 308 includes the data acquisition module 312, the cluster module 316, and the optimization module 314, although the optimization module may include other modules or data.

In accordance with various embodiments, the data acquisition module 212 may receive data from various data sources represented herein by data server 312. The data sources may include historical data 306 related to hardware, services, or other related data. In some instances, the historical data 306 may be located in separate tables, locations, and/or may be controlled or managed by other entities. For example, the historical data 306 may include customer survey information collected by a third party.

The data acquisition module 312 receives the historical data 306 from the data server 312 and provides the data to the cluster module 316 for association with respective cell sites. As discussed above, the data acquisition module 312 may perform some calculations of the data prior to optimizing various parameters of a cell site.

In various embodiments, the cluster module 316 may receive the data from the data acquisition module 212 and inputs 302. The inputs 302 may include data associated with the cell sites such as, and without limitation, an area of the radio network controller, baseline dates (time period), metrics to optimize, thresholds for the metrics, and/or other associated data, represented collectively as new data 304 in the example of FIG. 3.

Upon receiving the relevant data from the data server 312 and/or the inputs 302, the optimization manager 308 may provide the gathered historical data 306 and the new data 304 to the optimization module 314 to optimize the performance of a cell site. In one embodiment, upon the data acquisition module 312 determining that other cell sites are having similar KPI's that have exceeded predetermined thresholds, these cells may be grouped together in a cluster by the cluster module 316. Accordingly, in various scenarios, the optimization performed by the optimization module 314 may be with respect with an individual cell site (e.g., 302(4)) or a cluster (e.g., 302(10, 302(4) and 302(6)).

For example, the optimization module 314 may receive data (i) directly from the data acquisition module 312, or (ii) from the cluster module 316 with information regarding the cell sites that belong to the cluster. The optimization module 314 may then perform the optimization to create optimization results 320, which may be deployed to a cell site individually or to a cluster. The optimization results 320 may include parameter changes, implementation instructions, scripts to perform the changes, and/or other data to deploy the optimization for each cell site individually or in aggregate (i.e., group) for a cluster.

It should be noted that, in one embodiment, when a cluster is created, it need not be permanent. Rather, the optimization manager 308 may create a different cluster at predetermined intervals or upon a trigger event. For example, a new cluster may be automatically created by the optimization manager 308 upon the data acquisition module 312 receiving data from the data server 312 and/or the inputs 302 and determining that a group of cell sites are exhibiting similar KPI's that warrant a performance correction. By automating the operations described herein, the optimization manager 308 dynamically manages the wireless telecommunication network 100 by optimizing the performance of each cell site individually or in specific clusters of cell sites.

Example Processes

Figure 4:
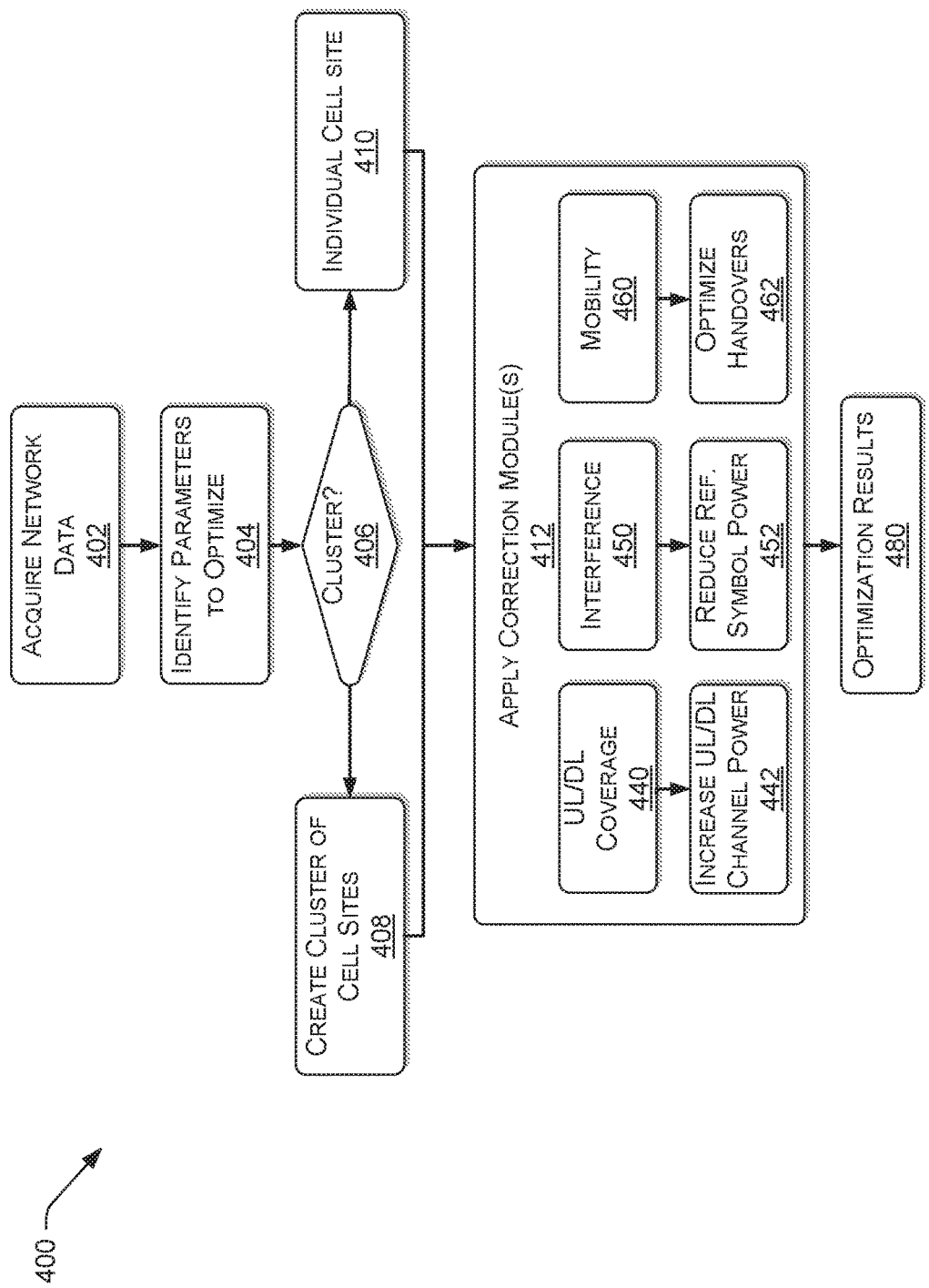
FIGS. 4 and 5 illustrate flow diagrams of example processes to optimize the performance of a wireless telecommunication network.
Figure 5:
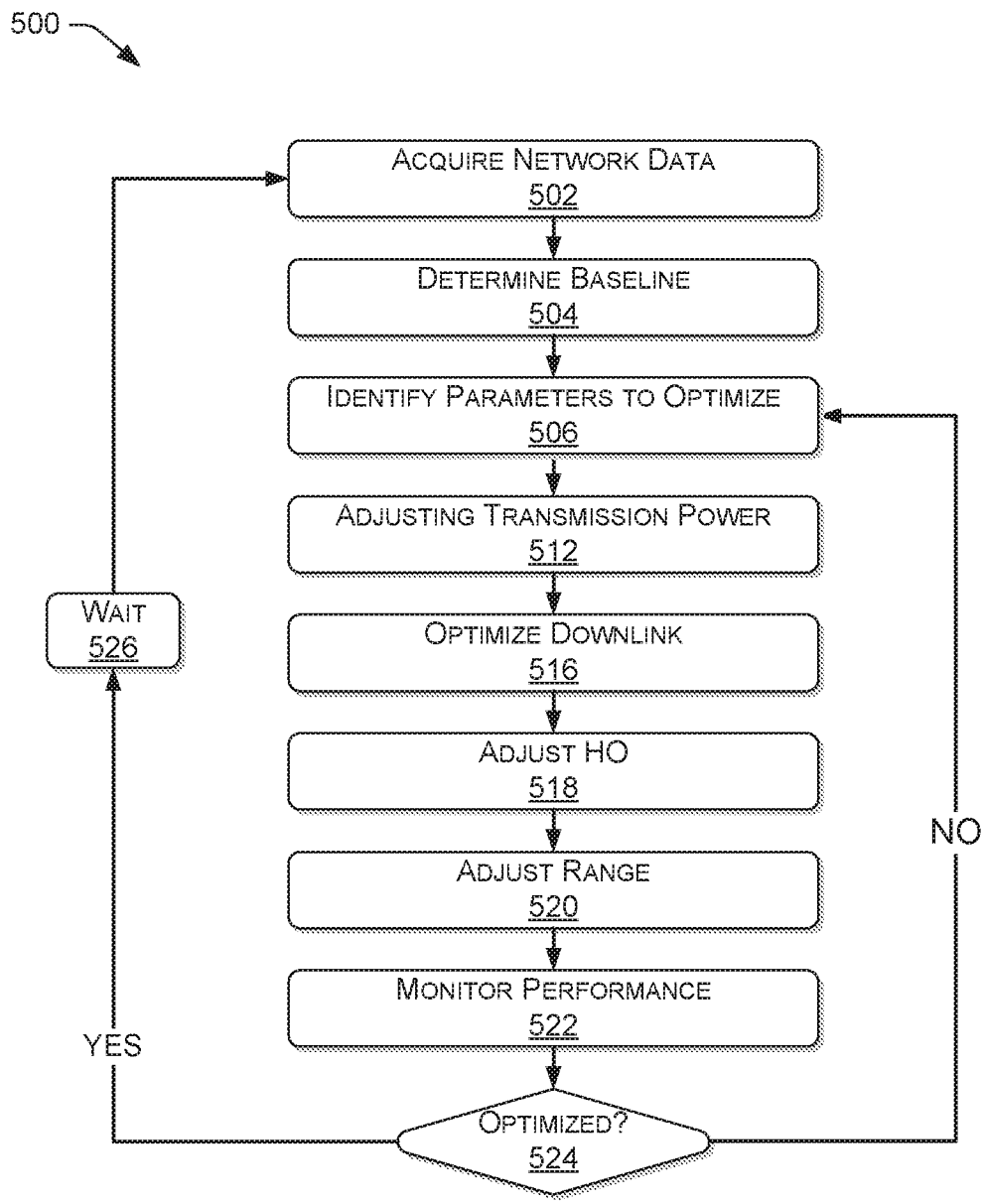

With the foregoing overview of an example network 100 that facilitates the optimization of the performance of a wireless telecommunication network by adjusting one or more parameters of a cell site or a cluster of cell sites of FIG. 1, it may be helpful to provide some example processes. To that end, FIGS. 4 to 5 illustrate flow diagrams of example processes to optimize the performance of a wireless telecommunication network. The processes are illustrated as a collection of blocks in a logical flow graph, which represent a sequence of operations that can be implemented in hardware, software, or a combination thereof. In the context of software, the blocks represent computer-executable instructions that, when executed by one or more processors, cause the one or more processors to perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. For discussion purposes, the process 400 and 500 are described with reference to the architecture 100 of FIG. 1, the controller 200 of FIG. 2, and the computing architecture of FIG. 3.

The process 400 may be performed by the optimization manager 208 of a central controller 110 of a wireless telecommunication network 100. At block 402, the data acquisition module 312 of the controller 200 may receive historical data 306 and new data 304 from various sources, such as inputs 302 and the data server 312 of FIG. 3. The historical data 306 and/or the new data 304 can be used to create a baseline performance of each cell site. In one embodiment, the baseline performance may be based on KPI's of each individual cell site that have been stored in the data server 312 to indicate an average expected operation of the respective cell site for each KPI. In other embodiments, the KPI's may be based on new data 304, which is used to identify average KPI's for all cell sites or cell sites that were grouped together by similar capability to identify a present average of all cell sites of the wireless telecommunication network 100 or similarly situated cell sites. In other embodiments, the KPI's are based on predetermined values that may have been programmed by an administrator of the wireless telecommunication network 100.

At block 404, the optimization manager 308 identifies parameters to optimize. For example, the KPI's, which may be based on the new data 304, are compared to the baseline(s) to identify outliers therefrom. If one or more KPI's have exceeded predetermined thresholds based on the related baseline, then it is indicative that one or more parameters should be adjusted.

At optional block 406, the optimization manager 308 (i.e., cluster module 316 thereof) determines whether other cell sites have KPI's that have exceeded similar baseline thresholds. If so (i.e., "YES" at decision block 406), at block 408, these cell sites are grouped together into a cluster. However, if other cell sites are not identified having substantially similar KPI issues, (i.e., "NO" at decision block 406), the process continues with block 410, where the optimization manager 308 focuses on an individual cell site to optimize.

Accordingly, clusters may be identified as groupings of cell sites that have the same or similar performance patterns based on the parameters (received data), rather than on arbitrary information, such as geographical designation (e.g., city, rural, etc.,). In some embodiments, the number of cell sites per cluster may be limited to a predetermined number to assure that each cell site is optimized, instead of suffering from the consequences of an adjustment of parameters that is not optimal for each individual cell site, but rather accommodates an "average" cell site benefit.

At block 412, the optimization module may apply one or more correction modules 440 to 460 to optimize (e.g., adjust) various aspects of each cell site individually (or by way of cluster). The modules 440 to 460 that are applied depend on the one or more KPI's, that have exceeded predetermined threshold values based on determined baselines, as discussed previously. In some embodiments, the optimizations may include changes to one or more parameters of a cell site. For example, at block 440, the uplink (UL) and/or downlink (DL) coverage module may be applied. For example, to improve the UL coverage, at block 442, the UL power is increased to improve UL coverage and to reduce the number of dropped calls. Similarly, the DL coverage can be improved by increasing the DL power.

At block 450, the interference module may be applied, where at least one of (i) the reference symbol power is reduced, and (ii) the control channel elements (CCE) position in the LTE Radio Frame is modified to randomize and reduce the interference and improve transmission quality (i.e., block 412).

At block 460, the mobility module may be applied, where handovers (HOs) are optimized. For example, at block 462, the offsets on the HO thresholds are adjusted to minimize drops in calls. Put differently, the number of handovers are reduced, which may be prone to dropped calls (e.g., failed handovers), by increasing the threshold that would trigger a handoff. Alternatively, the thresholds may be reduced to increase the number of handoffs are increased to prevent too late handovers.

In various situations, one or more correction modules may be used to create the optimization results message (i.e., block 480). These blocks are then distributed to an individual cell site or the cluster of cell sites, accordingly. By virtue of adjusting or setting parameters for each cell site that is deemed to have KPI's that exceed predetermined thresholds, the wireless telecommunication network 100 is optimized for performance.

FIG. 5 is a flow diagram of an illustrative process 500 to iteratively adjust parameters of an individual cell site or cluster of cell sites. The process 500 may be performed by the optimization manager 308 and various modules associated therewith.

At block 502, the data acquisition module 312 of the controller 200 may receive historical data 306 and new data 304 from various sources, such the data server 112 and inputs 302, respectively. The historical data 306 and/or the new data 304 can be used to create a baseline performance of each cell site (i.e., block 504). The historical data 306 and the new data 304 are collectively referred to herein as network data. In one embodiment, the baseline performance may be based on KPI's of each individual cell site that has been stored in the data server 312. This data indicates an average operation of the respective cell site for each KPI. In other embodiments, the KPI's may be based on new data 304, which is used to identify average KPI's for all cell sites (or cell sites that are grouped together by similar capability). In other embodiments, the KPI's are based on predetermined values that may have been programmed by an administrator of the wireless telecommunication network 100.

At block 506, the optimization manager 308 identifies parameters to optimize. For example, the KPI's, which may be based on the new data 304, are compared to the baseline(s) to identify outliers therefrom. If one or more KPI's have exceeded predetermined thresholds based on the related baseline, then such deviation is indicative that one or more parameters should be adjusted, and the cell site is deemed to be non-compliant.

In one embodiment, upon the optimization manager 308 identifying parameters to optimize, the cluster module 316 determines whether other cell sites are having similar KPI's that have exceeded predetermined thresholds. If so, these cell sites may be grouped together in a cluster by the cluster module 316, and the following operations of process 500 are performed on a cluster of cell sites.

At block 512, optimization of uplink (from UE to cell site) transmission power is performed. More particularly, for UEs whose transmitted power reached the allowed maximum value (UEs with higher power restriction ratio), the UL transmission power is reduced. Put differently, the criteria for performing an optimization of transmission power may be based on determining whether the cell site: (i) has a predetermined percentage of time where the UE's transmitted power reaches a maximum value is greater than a predetermined reference threshold percentage (i.e., a power restriction ratio); (ii) the VoLTE drop call rate of the cell site is greater than a predetermined percentage; and (iii) there are at least a predetermined number of VoLTE voice calls hosted by the cell site in a predetermined time period.

In this regard, it is noted that an LTE's usable coverage can be characterized by a downlink (DL) (i.e., from a cell site to a UE) coverage parameter and an uplink (UL) (i.e., from a UE to a cell site) coverage parameter. Both links are salient for any calls for sustainable call quality. For example, there may be multiple cells where, at the cell edges, there could be a good or acceptable downlink coverage, but very weak to no uplink coverage. At the weaker uplink coverage, the UE's power may not be sufficient to communicate to the baseline, which leads to poor QOS. By the optimization manager 308 using the UL/DL coverage correction module 440 of FIG. 4, a cell site that has been identified to have a power restriction issue is corrected, thereby extending the UL coverage and improving the QOS (e.g., throughput, retain-ability, etc.) of the UE using the affected cell site.

Upon determining that the criteria are met, the "Required Power Spectral Density (PSD)/Received Power at: the cell site on the uplink parameters (i.e., pZeroNominalPusch) are increased by a predetermined dB value. Further an 'Alpha' that governs the slope of curve between Received PSD and Uplink Path-loss, is reduced by a predetermined value. By virtue of these adjustments performed by the UL/DL coverage correction module 440 of FIG. 4, the PSD at lower uplink path-loss (i.e., close to the cells) is increased, thereby providing better QOS (e.g., throughput, retain-ability, etc.) for UEs closer to the cell station. At the same time, for the UE at the cell edges, the "Required PSD" reduces, which assists UEs to transmit at a lower power, thereby reducing the UE's "Power Restriction," reducing UL Interference, and improving UL coverage and QOS for the respective UE. Row 600D of the table of FIG. 6A provides a summary of relevant KPI's and example solutions for optimization of the power restriction.

At block 516, optimization of downlink (from cell site to UE) transmission power is performed by adjusting a gain of a cell specific reference signal (CRS) of the subject cell site by the optimization manager 308. For example, it is understood that with a growing cell site intensity (i.e., higher number of cell sites within a geographical area) in the wireless telecommunication network 100, inter site interference may become an increasing concern in traditional systems. There are several ways to reduce inter-site interference, including reducing transmission power. However, reducing the transmission power in all cell sites, has an impact on the coverage foot-print, which may detrimentally affect the quality of service to users of the wireless telecommunication network 100. In this regard, the optimization manager 308 identifies whether each individual cell site has a sufficient coverage foot-print to warrant a reduction of the downlink transmission power. Put differently, the transmission power is adjusted automatically by the optimization manager 308 for each cell site individually.

The criteria for determining whether to reduce the downlink (DL) transmission power may include determining whether: (i) the session continuity to older communication networks, such as, without limitation, Wideband Code Division Multiple Access (WCDMA) and Global System for Mobile Communications (GSM) are less than a predetermined threshold percentage value; and (ii) a predetermined percentage of HO attempts are happening to 'neighboring cells (excluding geographically co-located cells) at a distance less than the average neighbor distance of the cell site.' This is to make sure that there is a sufficient amount of coverage overlap between a cell site and its neighbors, such that transmission power reduction will not cause a coverage loss. Additional criteria may include determining whether (iii) an average busy hour channel quality index (CQI) for a subject cell site plus a predetermined top number of closest neighbors (e.g., 5) based on HO attempts is below a predetermined threshold value. In this way, the optimization manager 308 verifies that there is an "inter site interference" issue in the coverage foot-print of the subject cell site.

Upon determining that the criteria are met, the downlink (DL) transmission power is reduced through a parameter (i.e., crsGain) by a predetermined dB value. If the crsGain parameter is changed to 0 dB, the DL Transmission Power on the physical downlink shared channel (PDSCH) Type B channel parameter (i.e., pdschTypeBGain) is increased. Additional power on the PDSCH Type B, may enhance the data rate (e.g., user throughput). By lowering crsGain parameter on the subject cell site, which met the above discussed criteria, the optimization manager 308 prevents loss of wireless telecommunication coverage while minimizing the inter site interference. Row 600G of the table of FIG. 6B provides a summary of relevant KPI's and example parameter adjustments for optimization of the CRS.

At block 518, the handover (HO) between a first cell site and a second cell site is adjusted for various issues, including without limitation for, (i) physical downlink control channel (PDCCH) robustness, (ii) too late HO, (iii) too early HO, and (iv) mobility optimization (i.e., prevention of handover to a wrong cell site).

Robustness of handover is based on determining whether a CFI1 utilization is above a predetermined threshold and a HO Execution success rate is below a predetermined threshold. Typically, in a high mobility region (e.g., where UE traverses one or more cellular zones and a handover is likely), the UE may have access to multiple LTE cells. If the "control signaling message" parameter, through a PDCCH channel, is transmitted on the first Orthogonal Frequency-Division Multiple Access (OFDMA) symbol in the LTE frame (CFI=1), there is a possibility of collision of that communication with other neighboring cells. This collision is due to most cells transmitting similar messages on CFI=1 to the subscribed users on their UE. This collision could lead to a handover failure, which impacts a customer's QOS. To that end, the optimization manager provides a way to identify cell sites that have such handover failures and provides a solution therefor.

The criteria for determining whether to adjust the PDCCH handover parameters may include determining whether: (i) a subject cell with the utilization of the first OFDMA symbol in an LTE EUTRAN sub-frame (CFI=1) is greater than a predetermined percentage value; and (ii) the handover execution success rate is below a predetermined percentage.

Upon determining that the criteria are met, the optimization manager 308 prohibits the use of the first OFDMA symbol (CFI=1) for users in the handover region, by adjusting a 3GPP parameter (i.e., adaptiveCfiHoProhibit to 1). Further, instead of CFI=1, the subject cell site could be adjusted to use CFI 2 or 3. This prohibition facilitates the reduction of the transmission on CFI=1 in the handover region (where multiple cells overlap), thereby minimizing and randomizing the inter site interference on the PDCCH. Accordingly, the handover success rate is improved. In some scenarios, the retain-ability for the cell site is improved as well. Row 600I of the table of FIG. 6B provides a summary of relevant KPI's and example parameter adjustments for optimization of the PDCCH handover.

In some embodiments, the PDCCH power is boosted for cells requesting more than a threshold number of control channel elements (CCE). The criteria for determining whether to adjust the PDCCH power may include determining whether: (i) a predetermined percentage of time a cell site provides a predetermined number (e.g., 8) CCE Aggregation parameter (% TxAggressive) is above a first percentage value; and (ii) the PDCCH control channel usage is below a second percentage value. In one embodiment, the criteria to revert back from an active power boost is: (i) the PDCCH usage is above a third threshold percentage value; and (ii) the parameter TxAggressive is below a fourth threshold value. The first, second, third, and fourth threshold values may be default values or values that are tailored for the specific cell site by a system administrator.

Upon determining that the criteria for PDCCH power boosting are met, the boosting power on the DL control channel is adjusted by setting parameter pdcchpowerboostmax=P (where P is a non-zero value), for the subject cell site. Increased PDCCH power improves PDCCH coverage, especially for cell edge users. Increased PDCCH power may help with better retainability (drop call rate) and better throughput (data rate). Row 600J of the table of FIG. 6B provides a summary of relevant KPI's and example parameter adjustments for optimization of the PDCCH power.

The handover between a first cell site and a second cell site can also be adjusted for the timing of the handover (e.g., a too late HO or a too early HO). In typical systems, the timing of the handover from a source cell site to a neighbor target cell site may affect the success of the actual handover, which is reflected in the number of dropped calls. In this regard, the optimization module 308 is configured to determine whether a cell site has a HO timing issue and adjust various parameters in order to increase the probability of a successful transition from one cell site (i.e., source) to another (i.e., target).

The criteria for determining whether to adjust the handover parameters, various Ericsson "performance counters" may be used to identify relevant KPI's. For example, to identify a late handover, the optimization manager 308 determines whether: (i) the performance counter parameter PMHOTOOLATEHOINTRAF (i.e., operative to indicate a number of too late handovers) is above a predetermined threshold X (e.g., the number of too late handovers greater than X); (ii) the percentage value of the performance counter parameter PMHOTOOLATEHOINTRAF is above a second predetermined threshold Y (e.g., percentage of too late HOs to total handovers greater than Y %); and (iii) the performance counter parameter indicating a number of drop calls PMERABRELABNORMALENBACTHO is above a third predetermined threshold Z (e.g., number of call drops due to handovers greater than Z). For example, the threshold values for X, Y and Z may be predefined by a system administrator of the wireless telecommunication network 100 and may vary based on the region and/or the type of cell site.

Upon determining that the above criteria are met, thereby identifying a late handover concern for a subject cell site, the parameters cellindividualOffsetEutran and QoffsetEutran are changed. These two parameters affect the offset on a signal level to trigger a handover and reselection to a better cell. In one embodiment, the values of the cellindividualOffsetEutran and QoffsetEutran are based on the relationships provided in Table 1 below:

TABLE 1

| Condition | New Setting |
|---|---|
| n < % of too late HOs to total handovers < m | cellindividualOffsetEutran = a; qoffsetEutran=−a |
| m < % of too late HOs to total handovers < o | cellindividualOffsetEutran = b; qoffsetEutran=−b |
| % of too late HOs to total handovers > o | cellindividualOffsetEutran = c; qoffsetEutran=−c |

Table 1 above demonstrates that if the performance counter parameter indicative of the % of too late HOs to total handovers (i.e., PMHOTOOLATEHOINTRAF) is in a first range (i.e., n to m), then parameter cellindividualOffsetEutran is set to a first predetermined value a, and the parameter qoffsetEutran is set to the opposite polarity of the same value (i.e., -a), and so on.

Similar concerns may arise when the HO from a first cell site to a second neighboring cell site is too early. The criteria to identify a handover that is too early, the optimization manager 308 determines whether: (i) the parameter (e.g., a performance counter) indicative of a too early handover PMHOTOOEARLYHOINTRAF is above a predetermined threshold X (e.g., the number of too early handovers greater than X); (ii) the percentage value of the parameter PMHOTOOEARLYHOINTRAF is above a second predetermined threshold Y (e.g., percentage of too early HOs to total handovers greater than Y %); and (iii) the parameter indicating a number of drop calls PMERABRELABNORMALENBACTHO is above a third predetermined threshold Z (e.g., number of call drops due to handovers greater than Z). For example, the threshold values for X, Y and Z may be predefined by a system administrator of the wireless telecommunication network 100 and may vary based on the region and/or the type of cell site.

Upon determining that the above criteria are met, thereby identifying an early handover concern for a subject cell site, the parameters cellindividualOffsetEutran and QoffsetEutran, which are operative to control an offset on a signal level to trigger a handover and reselection to a better cell, are changed. In one embodiment, the values of the cellindividualOffsetEutran and QoffsetEutran are based on the relationships provided by Table 2 below:

TABLE 2

| Condition | New Setting |
|---|---|
| n < % of too early HOs to total handovers < m | cellindividualOffsetEutran = − a; qoffsetEutran=a |
| m < % of too early HOs to total handovers < o | cellindividualOffsetEutran = −b; qoffsetEutran=b |
| % of too early HOs to total handovers > o | cellindividualOffsetEutran = −c; qoffsetEutran=c |

Accordingly, the timing of the HO can be adjusted by the optimization manager 308 for both a too late and a too early HO scenario by adjusting the relevant parameters. Rows 600K and 600L of the table of FIG. 6C provide a summary of relevant KPI's and example parameter adjustments for optimization of the HO parameters for a too late and a too early HO, accordingly.

As mentioned previously, in typical communication networks, when a UE is moved from one zone to another, an ongoing communication of the UE may be handed over to an incorrect target cell, resulting in a dropped call. In this regard, the optimization manager 308 is configured to optimize the handover process to avoid a misguided HO.

In one embodiment, the determination whether a source to target cell site pair exhibits a HO problem is based on monitoring specific counters of the wireless telecommunication network 100 and by determining whether the value of the counters exceed predetermined thresholds. More particularly, the criteria may be based on whether: (i) the distance from the source cell to target cell is above a predetermined threshold L; (ii) the parameter PMHOWRONGCELLINTRAF is above a second predetermined threshold X (e.g., the number of handovers to wrong cell greater than X); and (iii) the percentage value of the parameter PMHOWRONGCELLINTRAF is above a predetermined third threshold value Y (e.g., the percentage of handovers to a wrong cell to the total handovers is greater than Y % for the pair source target cell). As used herein, the example threshold values L, X and Y may be defined by a system administrator of the wireless telecommunication network 100 and may vary based on the region and/or the type of cell site.

Upon determining that the criteria are met, the parameters isHoAllowed and isRemoveAllowed are adjusted to indicate that the source target neighbor relation is incorrect and therefore such a relation is put on a "blacklist". Accordingly, handovers to a wrong cell site are substantially reduced or even prevented. Row 600M of the table of FIG. 6C provides a summary of relevant KPI's and example parameter adjustments for optimization of the HO parameters to prevent a wrong HO.

In one embodiment, in addition to preventing a HO to a wrong cell, the optimization manager 308 is configured to identify cells (referred to herein as a "third cell") that receives "call re-establishments" from multiple source cells, after failing handover attempts towards a wrong target cell. Call Re-establishments are referred to herein as calls, continuing to a cell, without user experiencing interruption, but not through a network guided handover process.

The criteria for determining call re-establishments on a source to "third cell" relation, after HO to a wrong cell, includes monitoring specific one or more counters. For example, to identify a scenario where reestablishing a HO is warranted, the optimization manager 308 determines whether: (i) the distance from the source cell site to the "third cell" site is above a predetermined threshold distance (e.g., 4 miles); and (ii) a number of HOs to a wrong cell reestablishments is above a predetermined threshold (e.g., 20), from multiple (e.g., 5) source cells towards this "third cell" The threshold distance and the predetermined threshold number of HOs to a wrong cell may be adjusted by a system administrator of the wireless telecommunication network 100.

In various embodiments, upon determining that the criteria are met for a source to "third cell" target cell site pair, and upon determining that the target cell (third cell) site is an over-shooter (e.g., has a too wide communication range), then an antenna of the target cell (third cell) site is tilted down by a predetermined value to reduce the coverage of the target cell (third cell) site. By virtue of adjusting the tilt of such sites, unnecessary overshooting of coverage is reduced and proper network guided handovers happen to the right cells, which improves the handover success rate and retainability.

At block 520, the cell site range is adjusted. Consider, for example, that every cell site in an LTE network may have a defined maximum cell range related to a maximum distance from the cell site to a UE that can access the cell site. There typically is a default distance value. However, in some scenarios (e.g., rural environments, where the UE may be more than the default distance value from a cell site and/or due to a limitation in the current setting of a maximum cell range) the UE may not be able to access the services of the wireless telecommunication network 100. In this regard, by adjusting the cell range by the optimization manager 308, the cell site range can be expanded.

The criteria for determining whether to adjust the cell range parameters, several KPIs may be used. For example, the criteria may include determining at least one of: (i) whether handover execution failures are above a predetermined threshold N; (ii) whether a random access channel (RACH) decoding rate is below a threshold percentage rate M %; and (iii) whether a RACH Failure rate due to the cell range restriction is above a threshold percentage rate K %.

Upon determining that the criteria are met, in one embodiment, the optimization manager 308 may increase the cellRange parameter value, thereby allowing the cell site to receive and decode RACH requests from UE that is farther than typical. The cellRange parameter is operative to control transmission range of the subject cell site range. This means, by increasing the cellRange parameter, the usable coverage of the cell is now extended. In some embodiments, before the cellRange parameter is adjusted, it is first determined whether RF shaping is required, whether the subject cell is overshooting, and/or whether the subject cell is covering unintended areas. Sometimes, RF shaping is sufficient to limit the RF coverage area. RF shaping may be a combination of many physical configuration changes: antenna swaps, RC changes, tilts, power, azimuths, site replacements, site takedowns, etc. The wireless telecommunication network 100 generally benefits from iterative footprint optimization. In some embodiments, the cellRange parameter is adjusted without initially sending instructions to adjust the tilt of one or more antennae of the cell site (e.g., to prevent other UE in that area to be disadvantaged by such adjustment).

At block 522, the performance of the cell that has been optimized is monitored. For example, the data acquisition module 312 of the controller 200 may receive new data 304 from various sources, such as inputs 302 the data server 112 to obtain the latest KPI's therefrom related to the subject cell site. The new data 304 can be used to compare the new performance of the cell site to the baseline performance, thereby determining (i.e., block 524) whether the optimization is successfully realized (e.g., determining whether the adjusted performance of the cell site is within a baseline performance range of the wireless telecommunication network 100 that was calculated previously at block 504).

Upon determining that the desired optimization is achieved (i.e., "YES" at decision block 524), the optimization manager 308 concludes that the subject cell site is within predetermined one or more ranges of the baseline previously calculated in block 504. The process then loops back to block 502 to receive network data, after a waiting period (i.e., block 526), thereby restarting the process. By way of non-limiting example, the wait period may be a periodic interval such as an hour, a day, a week, quarterly, etc. Accordingly, the wait period may be any appropriate wait period to maintain the wireless telecommunication network 100 in an efficient way. In some embodiments, there may be a trigger to override the wait period, such that the process begins immediately. In various embodiments, a trigger event may be a natural, social, or architecture event (e.g., hurricane, concert, introduction of new cell sites, etc.,).

Upon determining that the desired optimization is not achieved (i.e., "NO" at decision block 524), the process continues iteratively to block 506, to identify parameters to optimize, as discussed previously. The iterative process continues until the desired optimization is achieved (i.e., the monitored performance at block 522 indicates that the KPI's of the subject cell site are within a predetermined ranges of the baseline calculated previously in block 504).

Conclusion

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

It is understood that any specific order or hierarchy of steps in the process disclosed in FIGS. 4 and 5 are illustrations of exemplary approaches. Based upon design preferences, it is understood that the specific order or hierarchy of blocks in the processes may be rearranged, expanded, and some steps omitted. Some of the blocks may be performed simultaneously. For example, the action of load balancing and optimization of cellular coverage of FIG. 5 may occur concurrently or may be omitted.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The claims, description, and drawings of this application may describe one or more of the instant technologies in operational/functional language, for example as a set of operations to be performed by a computer. Such operational/functional description in most instances can be specifically-configured hardware (e.g., because a general purpose computer in effect becomes a special purpose computer once it is programmed to perform particular functions pursuant to instructions from program software).

Although the operational/functional descriptions described herein are understandable by the human mind, they are not abstract ideas of the operations/functions divorced from computational implementation of those operations/functions. Rather, the operations/functions represent a specification for the massively complex computational machines or other means. As discussed in detail below, the operational/functional language is to be read in its proper technological context, i.e., as concrete specifications for physical implementations.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computing device configured to administer a wireless telecommunication network (WTN) having a plurality of cell sites, the computing device comprising:
   a processor;
   a network interface communicatively coupled to the processor and configured to enable communications with the WTN;
   a storage device coupled to the processor;
   an application stored in the storage device, wherein execution of the application by the processor configures the computing device to perform acts comprising:
      receiving network data from a data source for a subject cell site of the plurality of cell sites;
      determining a baseline performance of the subject cell site based on the received network data;
      identifying parameters to optimize for the subject cell site based on the baseline performance;
      adjusting an uplink (UL) transmission power for the subject cell site based on a Voice over Long Term Evolution (VoLTE) drop call rate, a number of VoLTE calls during a predetermined time period, and a predetermined power restriction ratio;
      adjusting a DL transmission power of a cell specific reference signal (CRS) of the subject cell site;
      adjusting a handover operation between the subject cell site and a second cell site; and
      adjusting a transmission range of the subject cell site.

2. The computing device of claim 1, wherein adjusting a DL transmission power of a cell specific reference signal (CRS) of the subject cell site, comprises:
   determining whether the subject cell site meets a set of criteria, comprising:
      (i) a session continuity measurement value to a second communication network is less than a predetermined threshold value;
      (ii) a predetermined percentage of handover (HO) attempts for the predetermined time period are occurring due to neighboring cells at a distance less than an average neighbor distance of the plurality of cell sites; and
      (iii) an average busy hour channel quality index (CQI) for the subject cell site plus a predetermined number of closest neighbors based on HO attempts is below a predetermined threshold value for the predetermined time period; and
   upon determining that the subject cell site meets the set of criteria, reducing a DL transmission power by a predetermined value.

3. The computing device of claim 1, wherein adjusting the handover operation between the subject cell site and a second cell site comprises increasing a physical downlink control channel (PDCCH) robustness, comprising:
   determining whether the subject cell site meets a set of criteria, comprising:
      (i) a utilization of a first Orthogonal Frequency-Division Multiple Access (OFDMA) symbol, in an LTE EUTRAN sub-frame, is greater than a predetermined percentage value; and
      (ii) a handover execution success rate is below a predetermined percentage; and
   upon determining that the subject cell site meets the set of criteria, prohibiting a use the first OFDMA symbol for the UE in a handover region.

4. The computing device of claim 1, wherein adjusting the handover operation between the subject cell site and a second cell site comprises preventing a too late handover (HO), comprising:
   determining whether the subject cell site meets a set of criteria, comprising:
      (i) a parameter indicating a number of too late handovers is above a predetermined threshold;
      (ii) a percentage value of the parameter indicating the number of too late handovers with respect to a total number of handovers in a predetermined time period is above a second predetermined threshold; and
      (iii) a parameter indicating a number of drop calls is above a third predetermined threshold; and
   upon determining that the subject cell site meets the set of criteria, adjusting parameters for an offset on a signal level to trigger a handover and reselection to a better cell, to predetermined values.

5. The computing device of claim 1, wherein adjusting the handover operation between the subject cell site and a second cell site comprises preventing a too early handover (HO), comprising:
   determining whether the subject cell site meets a set of criteria, comprising:
      (i) a parameter indicative of the too early handover is above a predetermined threshold;
      (ii) a percentage value of the too early handover parameter indicative of the too early handover, with respect to a total number of handovers in a predetermined time period, is above a second predetermined threshold; and
      (iii) a number of drop calls parameter indicating a number of drop calls is above a third predetermined threshold; and
   upon determining that the subject cell site meets the set of criteria, adjusting parameters for an offset on a signal level to trigger a handover and reselection to a better cell to predetermined values.

6. The computing device of claim 1, wherein adjusting the transmission range of the subject cell site, comprises:
   determining whether the subject cell site meets at least one of a set of criteria, comprising:
      (i) a number of handover execution failures in a predetermined time period is above a first predetermined threshold;
      (ii) a random access channel (RACH) decoding rate in the predetermined time period is below a second threshold percentage rate; and
      (iii) a RACH failure rate due to a cell range restriction in the predetermined time period is above a third threshold percentage; and
   upon determining that the subject cell site meets at least one of the set of criteria, and that that a radio frequency (RF) shaping is not sufficient to limit a RF coverage area of the subject cell site, adjusting a parameter operative to control a transmission range of the subject cell site to a predetermined value.

7. The computing device of claim 1, wherein receiving network data from a data source comprises receiving historical data for a predetermined time period and new data related to a cell site of the wireless telecommunication network.

8. The computing device of claim 1, wherein determining the baseline performance of the subject cell site comprises:
   extracting key performance indicators (KPI's) of the subject cell site over a predetermined time period; and
   determining an average value for each KPI for the predetermined time period.

9. The computing device of claim 1, wherein determining the baseline performance of the subject cell site comprises:
   extracting key performance indicators (KPIs) of other cell sites of the plurality of cell sites; and
   determining an average value for each KPI based on the plurality of cell sites.

10. The computing device of claim 1, wherein the acts further comprise, upon determining that another one or more other cell sites from the plurality of cell sites have similar key performance (KPI) values that exceed the baseline performance:
   including the subject cell site and the one or more other cell sites in a cluster; and
   applying all acts that are performed on the subject cell site also on the one or more other cell sites in the cluster.

11. The computing device of claim 1, wherein identifying parameters to optimize for the subject cell site based on the baseline performance comprises:
   comparing each KPI to its corresponding baseline KPI; and
   upon determining that a KPI exceeds its corresponding baseline KPI by a predetermined threshold, identifying the subject cell site to be non-compliant.

12. A non-transitory computer-readable medium having stored thereon a plurality of sequences of instructions which, when executed by a processor, cause the processor to perform actions to administer a wireless telecommunication network (WTN) having a plurality of cell sites, the actions comprising:
   receiving network data from a data source for a subject cell site of the plurality of cell sites;
   determining a baseline performance of the subject cell site based on the received network data;
   identifying parameters to optimize for the subject cell site based on the baseline performance;
   adjusting an uplink (UL) transmission power for the subject cell site based on a Voice over Long Term Evolution (VoLTE) drop call rate, a number of VoLTE calls during a predetermined time period, and a predetermined restriction ratio;
   adjusting a DL transmission power of a cell specific reference signal (CRS) of the subject cell site;
   adjusting a handover operation between the subject cell site and a second cell site; and
   adjusting a transmission range of the subject cell site.

13. The non-transitory computer-readable medium of claim 12, wherein adjusting a DL transmission power of a cell specific reference signal (CRS) of the subject cell site, comprises:
   determining whether the subject cell site meets a set of criteria, comprising:
      (iv) a session continuity measurement value to a second communication network is less than a predetermined threshold value;
      (v) a predetermined percentage of handover (HO) attempts for the predetermined time period are occurring due to neighboring cells at a distance less than an average neighbor distance of the plurality of cell sites; and
      (vi) an average busy hour channel quality index (CQI) for the subject cell site plus a predetermined number of closest neighbors based on HO attempts is below a predetermined threshold value for the predetermined time period; and
   upon determining that the subject cell site meets the set of criteria, reducing a DL transmission power by a predetermined value.

14. The non-transitory computer-readable medium of claim 12, wherein adjusting the handover operation between the subject cell site and a second cell site comprises increasing a physical downlink control channel (PDCCH) robustness, comprising:
   determining whether the subject cell site meets a set of criteria, comprising:
      (iii) a utilization of a first Orthogonal Frequency-Division Multiple Access (OFDMA) symbol, in an LTE EUTRAN sub-frame, is greater than a predetermined percentage value; and
      (iv) a handover execution success rate is below a predetermined percentage; and
   upon determining that the subject cell site meets the set of criteria, prohibiting a use of the first OFDMA symbol for the UE in a handover region.

15. The non-transitory computer-readable medium of claim 12, wherein adjusting the handover operation between the subject cell site and a second cell site comprises preventing a too late handover (HO), comprising:
   determining whether the subject cell site meets a set of criteria, comprising:
      (iv) a parameter indicating a number of too late handovers is above a predetermined threshold;
      (v) a percentage value of the parameter indicating the number of too late handovers with respect to a total number of handovers in a predetermined time period is above a second predetermined threshold; and
      (vi) a parameter indicating a number of drop calls is above a third predetermined threshold; and
   upon determining that the subject cell site meets the set of criteria, adjusting parameters for an offset on a signal level to trigger a handover and reselection to a better cell, to predetermined values.

16. The non-transitory computer-readable medium of claim 12, wherein adjusting the handover operation between the subject cell site and a second cell site comprises preventing a too early handover (HO), comprising:
   determining whether the subject cell site meets a set of criteria, comprising:
      (iv) a parameter indicative of the too early handover is above a predetermined threshold;
      (v) a percentage value of the too early handover parameter indicative of the too early handover, with respect to a total number of handovers in a predetermined time period, is above a second predetermined threshold; and
      (vi) a number of drop calls parameter indicating a number of drop calls is above a third predetermined threshold; and upon determining that the subject cell site meets the set of criteria, adjusting parameters for an offset on a signal level to trigger a handover and reselection to a better cell to predetermined values.

17. The non-transitory computer-readable medium of claim 12, wherein adjusting the transmission range of the subject cell site, comprises:
   determining whether the subject cell site meets at least one of a set of criteria, comprising:
   (iv) a number of handover execution failures in a predetermined time period is above a first predetermined threshold;
   (v) a random access channel (RACH) decoding rate in the predetermined time period is below a second threshold percentage rate; and
   (vi) a RACH failure rate due to a cell range restriction in the predetermined time period is above a third threshold percentage;
   upon determining that the subject cell site meets at least one of the set of criteria, and that that a radio frequency (RF) shaping is not sufficient to limit a RF coverage area of the subject cell site, adjusting a parameter operative to control a transmission range of the subject cell site to a predetermined value.

18. The non-transitory computer-readable medium of claim 12, further comprising, upon determining that: (i) a predetermined percentage of time the subject cell site has a control channel elements (CCE) parameter that is above a first percentage value, and (ii) a physical downlink control channel (PDCCH) usage that is below a second percentage value, then boosting a power of the PDCCH for the subject cell site.

19. A method to administer a wireless telecommunication network (WTN) having a plurality of cell sites, the method comprising:
   receiving, at a computing device that includes one or more processors and memory storing instructions executable by the one or more processors, network data from a data source for a subject cell site of the plurality of cell sites;
   determining, at the computing device, a baseline performance of the subject cell site based on the received network data;
   identifying, at the computing device, parameters to optimize for the subject cell site based on the baseline performance;
   adjusting, at the computing device, an uplink (UL) transmission power for the subject cell site based on a Voice over Long Term Evolution (VoLTE) drop call rate, a number of VoLTE calls during a predetermined time period, and a predetermined power restriction ratio;
   adjusting, at the computing device, a DL transmission power of a cell specific reference signal (CRS) of the subject cell site;
   adjusting, at the computing device, a handover operation between the subject cell site and a second cell site; and
   adjusting, at the computing device, a transmission range of the subject cell site.

20. The method of claim 19, wherein receiving network data from a data source comprises receiving historical data for a predetermined time period and new data related to a cell site of the wireless telecommunication network.

* * * * *